United States Patent Office 3,769,350
Patented Oct. 30, 1973

3,769,350
METHOD FOR MAKING 2,3-DIMETHYL-1,4-BIS-(3,4 - HYDROCARBONYLOXYPHENYL) - 1,4-BUTANEDIONE
Clark William Perry, Bogota, N.J., assignor to Hoffmann-La Roche Inc., Nutley, N.J.
No Drawing. Filed Dec. 9, 1968, Ser. No. 782,414
Int. Cl. C07c 49/76
U.S. Cl. 260—592    3 Claims

ABSTRACT OF THE DISCLOSURE

This invention is directed to the stereoselective synthesis of the food additive meso-nordihydroguaiaretic acid from a protected ortho dihydroxy benzene and intermediates in this synthesis.

BACKGROUND OF THE INVENTION

In the past, meso-nordihydroguaiaretic acid [meso-4, 4′(2,3 - dimethyltetramethylene) - dipyrocatechol] has found only limited use as a food additive and antioxidant due to the expense of its production. This is true since meso-nordihydroguaiaretic acid, which has the formula:

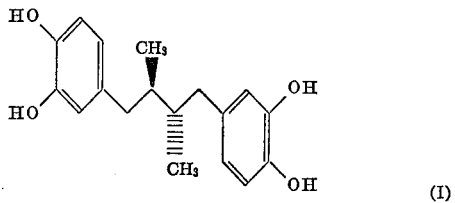

(I)

has been difficult to synthesize commercially. The only acceptable commercial method for its production has been by extraction from *Larrea divaricata*, the creosote bush, which is found in the southwest United States. This procedure has proven extremely disadvantageous due to the fact that nordihydroguaiaretic acid occurs only in small quantities in this plant. Therefore, a great quantity of plant material must be utilized in order to isloate a small quantity of natural nordihydroguaiaretic acid. Additionally, the process whereby nordihydroguaiaretic acid is isolated from *Larrea divaricata* has proven extremely cumbersome and uneconomical. Up until the present time, there has been no successful commercial process for directly chemically synthesizing nordihydroguaiaretic acid without isolating it from its natural source.

SUMMARY OF THE INVENTION

This invention is directed to stereoselectively synthesizing meso-nordihydroguaiaretic acid from a compound of the formula:

(II)

wherein $R_1$ and $R_2$ are lower alkyl, aralkyl, and taken together form a lower alkylene radical.

By means of this process, nordihydroguaiaretic acid can be produced from the compound of Formula II above economically and in high yields.

DETAILED DESCRIPTION OF THE INVENTION

As used throughout this application, the term, "lower alkyl," comprehends both straight and branched chain hydrocarbon groups containing from 1 to 6 carbon atoms such as methyl, ethyl, propyl, isopropyl, etc. The term "lower alkylene" includes both straight and branched chain alkylene radicals containing from 1 to 6 carbon atoms such as methylene, ethylene, propylene, butylene, isobutylene, etc. The term "lower alkanoyl" includes alkanoyl groups containing from 1 to 6 carbon atoms such as acetyl, propionyl, formyl, and butyryl. The term "aralkyl" includes aralkyl groups containing from 7 to 14 carbon atoms such as phenyl lower alkyl, i.e., benzyl, phenylethyl, etc. The term "halogen" includes all four halogens, i.e., iodine, bromine, chlorine and fluorine.

In the structural formulae given throughout the application, the substituents which are attached to the molecule above the plane of the molecule are designated by ▲ and the substituents which are attached to the molecule below the plane of the molecule are designated by ≡.

In accordance with this invention, a compound of the Formula I above is prepared from a compound of the Formula II above by means of the following reaction scheme:

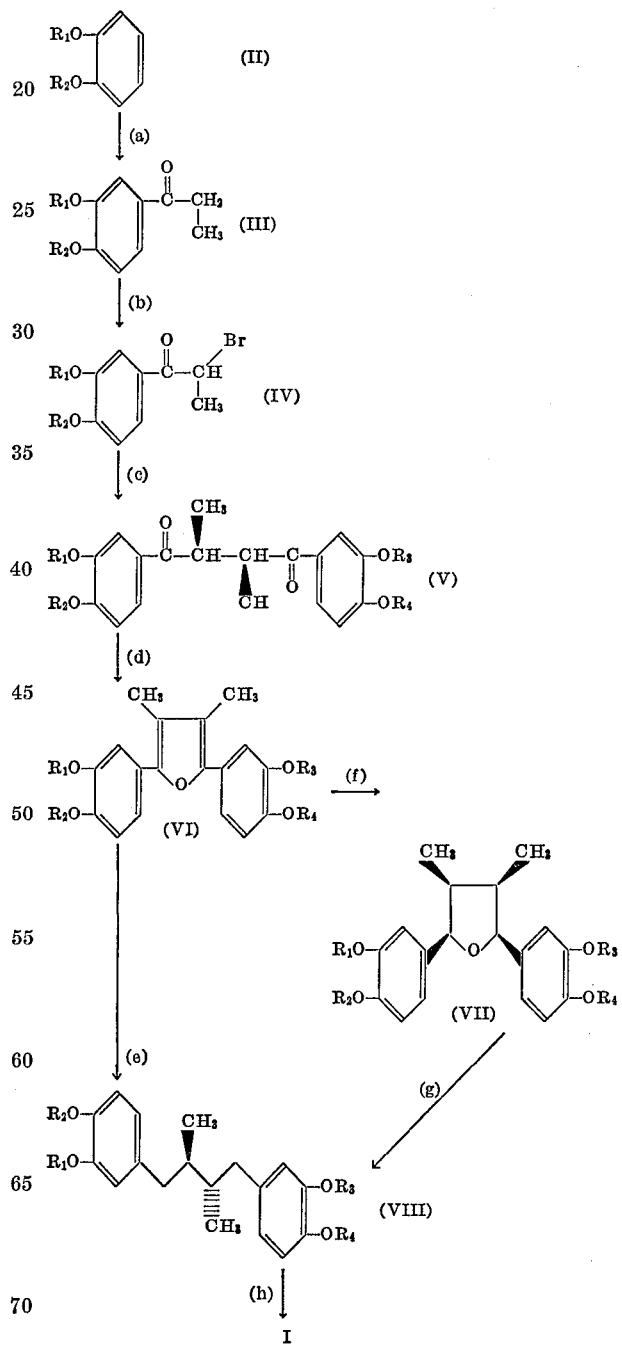

wherein $R_1$ and $R_2$ are as above, and $R_3$ and $R_4$ are selected from the group consisting of lower alkyl, aralkyl, and taken together form a lower alkylene radical.

The reaction of step (a) wherein the compound of the Formula II above is converted to the compound of the Formula III above has been previously carried out by reacting the compound of Formula I above with propionyl chloride via a Friedel-Crafts reaction. By utilizing this process the compound of Formula III above is produced in yields of at most 65 percent.

In accordance with this invention, it has been found that the compound of Formula II can be reacted with propionyl chloride or propionic anhydride and converted to the compound of Formula III in yields as high as 95 percent. This process is first carried out by reacting the propionic anhydride or propionyl chloride with a Friedel-Crafts catalyst in the presence of a halogenated hydrocarbon solvent to form a complex. In accordance with the process of this invention, the compound of Formula II is added to the complex. Upon the addition of the compound of Formula II to the complex, these materials react to form the compound of Formula III above.

The complex is simply formed by adding propionyl chloride or propionic anhydride to a Friedel-Crafts catalyst. In carrying out this reaction, any conventional inert halogenated hydrocarbon solvent such as chloroform, methylene chloride, carbon tetrachloride, etc., can be utilized. Any conventional Friedel-Crafts catalyst can be utilized. Among the conventional Friedel-Crafts catalysts which can be utilized in accordance with this invention are aluminum chloride, aluminum bromide, stannic chloride, stannous chloride, zinc chloride, antimony trichloride, etc. In carrying out this reaction, temperatures of from —15° C. to 35° C. should be utilized. Generally, it is preferred to carry out this reaction at 0° C. to 5° C.

The compound of Formula III above is prepared from the complex by simply adding the compound of Formula II above to this complex. This reaction is carried out in the same inert halogenated hydrocarbon solvent utilized to form the complex. In carrying out this reaction, temperatures of from about —15° C. to 35° C. can be utilized, with 0° C. to 5° C. being preferred. In obtaining the compound of Formula III in high yields and high purity from the compound of Formula II above, it is necessary to prepare the complex first before the addition of the compound of Formula II above. It is by first preparing this complex and then reacting this complex with the compound of Formula II above in the presence of the halogenated hydrocarbon solvent that the compound of Formula III above can be prepared in yields as high as 95 percent.

In carrying out the reaction of step (b) wherein a compound of the Formula III above is converted to a compound of the Formula IV, the same solvents that were utilized in step (a) can be utilized in this reaction. The reaction of step (b) is carried out by treating the compound of the Formula III above with bromine in the presence of a halogenated hydrocarbon solvent such as chloroform, carbon tetrachloride, etc. Any conventional halogenated hydrocarbon solvent can be utilized in carrying out this reaction. This reaction is carried out at the reflux temperature of the reaction medium. In carrying out this reaction from about 1.0 to about 1.05 moles of bromine, preferably 1.02 moles of bromine are utilized per mole of the compound of Fomula III above. In accordance with this invention, it has been found that by utilizing reflux temperatures, a mole ratio of from 1.00 to 1.05 moles of bromine per mole of the compound of Formula III above, and halogenated hydrocarbon solvents yields as high as 96 percent of the compound of Formula IV above can be obtained.

The compound of Formula IV above is converted to the compound of Formula V above by reacting the compound of the Formula IV above with a compound of the formula:

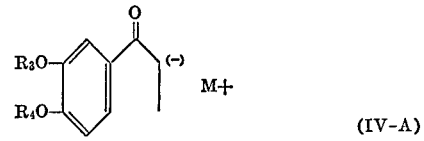

(IV-A)

wherein $R_3$ and $R_4$ are as above and M is an alkali metal such as sodium, potassium, etc.

The compound of the Formula IV-A is prepared by reacting the compound of the Formula III above with a strong alkali metal base in the presence of an inert solvent. Any conventional strong alkali metal base can be utilized in carrying out this reaction. Generally, it is preferred to utilize bases such as alkali metal hydrides and amide bases of the formula:

$$MNHR \qquad (X)$$

wherein M is as above and R is hydrogen or lower alkyl.

Among the preferred alkali metal hydrides are included sodium hydride, potassium hydride, etc. Among the preferred amide bases of Formula X above which can be utilized in this invention are included potassium amide, sodamide, sodium methylamide. Generally, it is prefered to carry out the reaction in an inert low boiling solvent such as a liquid ammonia. However, any conventional inert solvent can be utilized. In carrying out this reaction, temperature and pressure are not critical. Temperatures of from about —50° C. to 100° C. can be utilized in carrying out this reaction, depending upon the reflux temperature of the solvent.

The reaction of compounds of the Formula IV-A with compounds of the Formula IV to produce a compound of the Formula V is carried out in the presence of a solvent. Any conventional inert solvent can be utilized in this reaction. Among the conventional inert organic solvents which can be utilized in this reaction are hydrocarbons such as benzene, toluene, xylene, and the like; chlorinated hydrocarbons such as chlorobenzene and the like; ethers such as tetrahydrofuran, diethyl ether, dioxane and the like. Inorganic solvents such as liquid ammonia, which is preferred, can also be utilized. In carrying out this reaction, temperature and pressure are not critical and this reaction can be carried out at room temperature and atmospheric pressure. If desired, elevated temperatures or reduced temperatures can also be utilized. Generally, it is preferred to utilize a temperature of from about—50° C. to about 100° C. depending upon the reflux temperature of the solvent.

In accordance with this invention, it has been found that the reaction of step (c) produces the compound of the Formula V above in yields as high as 90 percent.

The conversion of the compounds of Formula V to compounds of the Formula VI, via reaction step (d), is carried out by treating the compound of the Formula V with a strong acidic agent. Any conventional strong acidic agent can be utilized in effecting the conversion of compounds of the Formula V to compounds of Formula VI. Among the conventional acidic agents which can be utilized in accordance with this invention are included hydrochloric acid, hydrobromic acid, sulfuric acid, acetic acid, p-toluene sulfonic acid, etc. In carrying out this reaction, it is preferred to utilize an inert organic solvent. Any conventional inert organic solvent can be utilized. Among the conventional inert organic solvents which can be utilized in accordance with this invention are included methanol, ethanol, as well as the organic solvents hereinbefore mentioned. In carrying out this reaction, temperature and pressure are not critical, and this reaction can be carried out at room temperature or elevated or reduced temperatures. Generally, it is preferred to carry out this reaction at a temperature of from 0° C. to 100° C.

In accordance with a preferred embodiment of this invention, the compound of Formula V above can be converted into the compound of Formula VI above, via reaction step (d), so as to produce a compound of Formula VI above in yields as high as 96 percent. It has been found that when the compound of Formula V above is treated with an alcoholic solution containing from about 0.1 to 5 percent by weight of hydrochloric acid, the compound of Formula VI can be obtained in yields as high as 96 percent. Generally, in carrying out this improved embodiment of step (d), no additional solvent other than the alcohol need be utilized. However, if desired, an additional solvent may be present in this reaction. This additional solvent can be selected from any of the conventional inert organic solvents. This improved embodiment of the reaction of step (d) is carried out at the reflux temperature of the reaction medium.

In the past, the compound of the Formula VI has been converted to compounds of the Formula VIII by hydrogenation in the presence of a palladium catalyst, preferably palladium oxide in an alcoholic or organic acid solvent such as acetic acid, methanol, etc. However, by this process, the compound of the Formula VIII above has been obtained in yields of at most 30 percent. Furthermore, in this reaction many by-products are formed which contaminate the final product and are difficult to separate therefrom. In accordance with this invention, it has been found that when the compound of the Formula VI above is hydrogenated in the presence of a catalyst selected from the group consisting of palladium oxide, palladium chloride, hydrogenated palladium chloride or hydrogenated palladium oxide in an organic ether or ester solvent, compounds of the Formula VIII above are obtained in yields as high as 80 percent. The hydrogenated palladium chloride and palladium oxide catalysts are formed by well-known techniques of mixing palladium oxide or palladium chloride with hydrogen gas in the presence of a conventional inert organic solvent such as mentioned hereinbefore. The use of ether or ester solvents in the reaction of step (e) substantially eliminates the formation of undesired non-separable by-products. The preferred solvent for use in this invention is tetrahydrofuran or ethyl acetate. However, any of the other conventional organic ether or ester solvents can be utilized in accordance with this invention. Among the other conventional organic ether or ester solvents which can be utilized in accordance with this invention are included dioxane, diethylether, etc. Generally, this reaction is carried out at a temperature of from about 0° C. to 100° C., depending upon the reflux temperature of the solvent.

In utilizing palladium chloride in step (e), it is desirable to incorporate an inorganic buffering agent in the catalyst system. Any conventional inorganic buffering agent can be utilized in the catalyst system of step (e). Among the inorganic buffering agents which can be utilized in step (e) are included sodium acetate, potassium acetate, sodium bicarbonate, potassium bicarbonate, potassium carbonate, etc. These inorganic buffering agents generally contain an alkali metal. The buffering agent is present in the catalyst system in an amount of 0.9 to 2 equivalents per equivalent of chloride ion contained within the palladium chloride catalyst.

In converting the compound of the Formula VI above to the compound of the Formula VII above via reaction step (f), the compound of the Formula VI above is hydrogenated in the presence of palladium as a catalyst. The palladium catalyst can be utilized alone or in combination with any of the conventional catalyst supports such as carbon black, calcium carbonate, or barium carbonate. In carrying out this reaction, it is generally preferred to utilize alcoholic solvents such as methanol, ethanol, etc. In carrying out the reaction of step (f), temperatures of from 50° C. to 125° C. and pressures of from about 500 to 1500 p.s.i.g. are utilized.

The conversion of compounds of the Formula VII above to compounds of the Formula VIII above, via reaction step (g) is carried out by hydrogenating the compound of the Formula VII above in the presence of a palladium chloride or palladium oxide catalyst utilizing an organic ether or ester inert solvent. The same conditions and catalysts that were utilized in carrying out reaction step (e) are utilized in carrying out the reaction of step (g).

When any one of $R_1$, $R_2$, $R_3$, and $R_4$ in the compound of the Formula VIII above are lower alkyl or aralkyl, the compound of the Formula VIII are above can be converted to the compound of the Formula I above via reaction step (h) by means of treating the compound of the Formula VIII above with a hydrolyzing agent. Any conventional means of ether hydrolysis can be utilized to convert the compounds of Formula VIII above to the compound of the Formula I above. Generally, it is preferred to utilize a hydrolyzing agent such as hydroiodic acid, hydrobromic acid, pyridine hydrochloride or boron tribromide in the presence or absence of an inert organic solvent. Any conventional inert organic solvent can be utilized in carrying out this reaction. In carrying out this reaction, temperature and pressure are not critical and the hydrolysis reaction may be carried out at room temperature and atmospheric pressure or at elevated and reduced temperatures or pressures.

When either, $R_1$ and $R_2$ or $R_3$ and $R_4$ form lower alkylene moieties in the compound of the Formula VIII above, the compound of the Formula VIII above is converted to the compound of the Formula I above, via reaction step (h), by treating the compound of the Formula VIII above with an ether hydrolyzing agent in the same manner mentioned above in connection with $R_1$, $R_2$, $R_3$ and $R_4$ being lower alkyl.

In accordance with another embodiment of this invention, the compound of Formula VII above can be converted into the compound of Formula VIII above by the following reaction scheme:

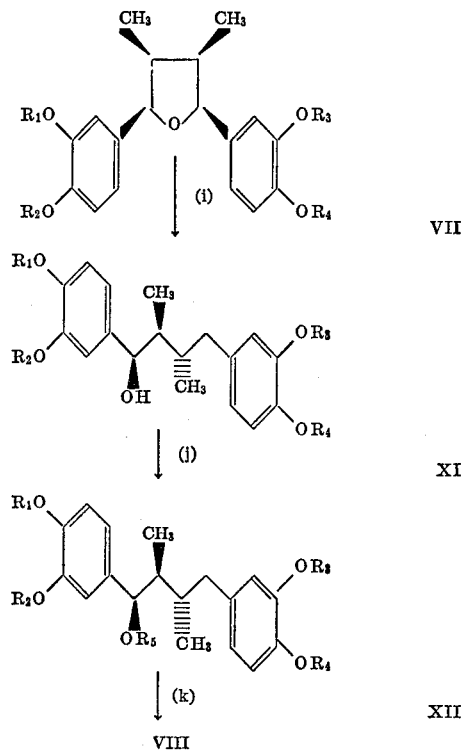

wherein $R_1$, $R_2$, $R_3$ and $R_4$ are as above, and $R_5$ is a lower alkanoyl.

The compound of Formula VII is converted to the compound of Formula XI via reaction step (i), by treating the compound of the Formula VII with an alkali metal in liquid ammonia. In carrying out this reaction, sodium and potassium are the preferred alkali metals. Generally, it is preferred to have an inert organic solvent present in the reaction medium. Among the conventional inert organic solvents which may be present in the reaction medium, tetrahydrofuran is preferred. Generally, this reaction is carried out at a temperature of from about −50° C. to −30° C.

The compound of Formula XI above is converted to the compound of Formula XII above via reaction step (j) by treating the compound of Formula XI above with an esterifying agent. Among the esterifying agents which can be utilized are included organic acid anhydrides or organic acid halides. Generally, this esterification reaction is carried out in the presence of an organic amine base. Among the conventional organic amine bases which can be utilized in accordance with this invention are included trimethylamine, pyridine, triethylamine. In carrying out this reaction, temperature and pressure are not critical and this reaction can be carried out at room temperature or at elevated or reduced temperatures. Generally, it is preferred to utilize the temperature of from 0° C. to 100° C.

The compound of Formula XII can be converted to the compound of Formula VIII above by hydrogenation, as in step (k), by utilizing the same conditions set forth with respect to step (e). This hydrogenation is carried out in the presence of a catalyst utilizing an inert ether or ester solvent as in step (e).

In accordance with another embodiment of this invention, the compound of Formula XI above can be directly converted into the compound of Formula VIII above by hydrogenation. This hydrogenation step is carried out utilizing the same conditions as in reaction step (k).

It is to be understood that while the structural formulae of compounds of the Formulae V, VII, VIII, XI, and XII are shown to represent a specific enantiomer, these formulae can also represent the antipode or racemic mixture thereof. It is apparent that the compound of Formula I above can be prepared from any of the optically active isomers of the compounds of Formulae V, VII, VIII, XI and XII as well as racemic mixtures thereof. This is true since all of the compounds of Formulae V, VII, VIII, XI and XII are converted to the symmetrical end product of Formula I above. The desired optically active antipodes of the compounds of Formulae V, VII, VIII, XI and XII above can be obtained from their racemic mixtures by standard resolution techniques.

The invention is further illustrated by the following examples. All temperatures are in degrees centigrade. Percent is given in percent by weight.

EXAMPLE 1

3,4-dimethoxy-propiophenone

To a cooled, well-stirred slurry of anhydrous aluminum chloride (22.0 g., 0.166 mole) in chloroform (80 ml.) at 0–5° C. under an atmosphere of dry nitrogen, was added a solution of freshly distilled propionyl chloride (12.0 g., 0.13 mole) in chloroform (10 ml.) at such a rate as to maintain a temperature of 0–5° C. When the addition was complete (about 15 min.), a solution of 1,2-dimethoxy benzene (13.8 g., 0.1 mole) in chloroform (10 ml.) was added in the same manner over a 30 minute period, during which time hydrogen chloride was slowly evolved. The reaction mixture became a nearly clear yellow-green solution, which was stirred at 0–5° C. for 1 hour after completion of the addition. With continued stirring and cooling, 3 N hydrochloric acid (100 ml.) was then added very cautiously dropwise, keeping the temperature below 30° C. When all the solids were dissolved, the phases were separated, and the lower organic phase was washed with 3 N sodium hydroxide solution (50 ml.) once, and the two aqueous solutions were back-extracted in succession with chloroform (50 ml.). The combined chloroform solution was dried over anhydrous magnesium sulfate, filtered, evaporated to dryness in vacuo, and the residue was crystallized from methanol (25 ml.) by chilling overnight in a freezer to yield 18.15 grams of 3,4-dimethoxy-propiophenone (93.8 percent yield).

EXAMPLE 2

α-Bromo-3,4-dimethoxy propiophenone

A solution of bromine (65.4 g., 0.408 mole, 2 percent excess) in chloroform (100 ml.) was added as rapidly as possible through an addition funnel to a refluxing solution of 3,4-dimethoxy propiophenone (77.6 g., 0.40 mole) in chloroform (300 ml.) with good agitation. The hydrogen bromide which was rapidly evolved was conducted from the top of the reflux condenser to a flowing water scrubber. When the addition was complete, the solution was refluxed for 10 minutes to drive off most of the hydrogen bromide, then the solvent was removed under reduced pressure. Crystallization of the residue from methanol (200 ml.) gave α-bromo-3,4-dimethoxy propiophenone (95.4 percent yield), M.P. 81–82°. (104.2 g.)

EXAMPLE 3

Racemic-2,3-dimethyl-1,4-bis-(3,4-dimethoxyphenyl)-1,4-butanedione

To liquid ammonia (approximately 50 ml.) was added powdered ferric chloride (50 mg.), then small pieces of sodium (0.51 g., 0.022 g.-atom, 10 percent excess) were added and the blue color allowed to dissipate over about a 20 minute period. To the resulting gray suspension of sodamide was added solid 3,4-dimethoxy propiophenone (3.88 g., 0.02 mole) in small portions and the mixture was stirred about 5 minutes. Solid α-bromo-3,4-dimethoxy propiophenone (5.46 g., 0.02 mole) was then added in small portions to the gray-green mixture, and the reaction mixture turned deeper green, then reddish, and finally tan colored. After the mixture was stirred one hour, solid ammonium chloride (2.68 g.) was added, followed by dichloromethane (50 ml.) and the gray mixture was then warmed cautiously to room temperature to evaporate most of the ammonia. The mixture was filtered with suction, the residual solids were extracted twice with dichloromethane, and the combined filtered solutions were concentrated to about 50 ml. in volume, diluted with methanol (75 ml.), and further concentrated to about 50 ml. in volume by boiling. 6.96 grams of racemic-2,3-dimethyl-1,4-bis(3,4-dimethoxyphenyl) - 1,4 - butanedione crystallized on stirring and cooling (90.3 percent yield).

EXAMPLE 4

3,4-dimethyl-2,5-bis(3,4-dimethoxyphenyl)-furan

To a boiling solution of racemic-2,3-dimethyl-1,4-bis (3,4-dimethoxyphenyl)-1,4 - butanedione (38.6 g., 0.10 mole) in dichloromethane (100 ml.) was added a 1 percent solution of hydrogen chloride in methanol (250 ml.) slowly with continued boiling. After about 5 minutes boiling, crystals separated and after chilling the slurry, 30.20 grams of 3,4 - dimethyl-2,5-bis(3,4-dimethoxyphenyl)-furan was obtained (82 percent yield). Concentration of the mother liquors afforded 4.56 grams of 3,4-dimethyl-2,5-bis(3,4-dimethoxyphenyl)-furan (12.4 percent yield). Further concentration afforded 0.5 grams of 3,4-dimethyl-2,5-bis(3,4 - dimethoxyphenyl)-furan (1.5 percent yield).

EXAMPLE 5

All cis-3,4-dimethyl-2,5-bis(3,4-dimethoxyphenyl)-tetrahydrofuran

Hydrogenation of the 3,4-dimethyl-2,5-bis(3,4-dimethoxyphenyl)-furan (36.8 g., 0.1 mole) over 10 percent palladium on calcium carbonate catalyst (5.0 g.) in ethanol (1000 ml.) at 125° C. under 1500 p.s.i.g. hydrogen for three hours, followed by filtration and removal of solvents gave a white solid (35 g.) which on recrystallization from ethylene chloride-methanol gave 29.8 g. of all cis - 3,4 - dimethyl-2,5-bis(3,4-dimethoxyphenyl)-tetrahydrofuran (80.4 percent yield). Concentration of the mother liquors gave a second crop (2.54 g., 6.8 percent yield) and a third crop (0.47 g., 1.3 percent yield).

EXAMPLE 6

The procedure wherein all cis-3,4-dimethyl-2,5-bis(3,4-dimethoxyphenyl)-tetrahydrofuran and 3,4-dimethyl-2,5-bis(3,4 - dimethoxyphenyl)-furan is hydrogenated is as follows:

A mixture of the compound to be reduced (2.0–4.0 g.), catalyst (usually 0.2 g.) and solvent (50 ml.) was agitated magnetically under an atmosphere of hydrogen at the desired temperature. After filtration of the spent catalyst, the filtrate was examined by gas chromatographic analysis (4' x ¼" O.D. copper column packed with 1.1 percent SE-30 0.2 percent Versamid 900 on AW/DMCS chromosorb G, 60–80 mesh; He carrier gas; 220–250° C.). For isolation of meso-2,3-dimethyl-1,4 - bis(3,4-dimethoxyphenyl)-butane, the solvents were removed and the residue was crystallized from 10–20 times its weight of hexane.

(a) Preparation of meso-2,3-dimethyl-1,4-bis(3,4-dimethoxyphenyl)-butane from 3,4-dimethyl-2,5-bis(3,4-dimethoxyphenyl)-furan 33.3 g. (90.5 mmoles) of 3,4-dimethyl-2,5-bis(3,4-dimethoxyphenyl)-furan in tetrahydrofuran (500 ml.) was hydrogenated over powdered palladium oxide (2.0 g.) at 50° C./1500 p.s.i.g. for about 10 hours. Gas chromatographic analysis indicated 77.8 percent of the product in the crude filtrate. Removal of solvent and crystallization of the residue (33.7 g.) from hexane (550 ml.) gave meso-2,3-dimethyl-1,4-bis(3,4 - dimethoxyphenyl)-butane (25.4 g., 78 percent yield).

(b) Preparation of meso-2,3 - dimethyl-1,4-bis(3,4-dimethoxyphenyl)-butane from all cis-3,4 - dimethyl-2,5-bis (3,4-dimethoxyphenyl)-tetrahydrofuran 745 mg. of all cis-3,4-dimethyl-2,5-bis(3,4-dimethoxyphenyl)-tetrahydrofuran (2 mmoles) in tetrahydrofuran (50 ml.) was hydrogenated over powdered palladium oxide (200 mg.) at 25°/1 atm. for 46 hours. Gas chromatographic analysis indicated 78.5 percent product in the crude filtrate. Removal of solvent and crystallization of the residue (848 mg.) from hexane gave crystalline meso-2,3-dimethyl-1,4-bis(3,4 - dimethoxyphenyl)-butane (543 mg., 76 percent yield).

EXAMPLE 7

4 g. of 3,4-dimethyl-2,5-bis(3,4 - dimethoxyphenyl)-furan, palladium chloride (0.400 g.), and buffer, in tetrahydrofuran (100 ml.) were shaken in a rocking autoclave with a glass liner under the hydrogen pressure for about 10 hours and then allowed to cool with continued rocking. Gas chromatography (4' x ¼" O.D. copper column packed with 1.1 percent SE-30 silicone gum and 0.2 percent Versamid 900 on 60–80 mesh chromosorb G/AW–DMCS, programmed from 225° C. to 275° C. at 2°/minute helium carrier gas at 60 ml./min.) of the filtered reaction mixture was used to determine relative yields. For isolation of meso-2,3-dimethyl-1,4-bis(3,4-dimethoxyphenyl)-butane, the solvent was removed under reduced pressure, the residue was taken up in about 5 ml. warm dichloromethane, 50 ml. hexane was added, and the solution was boiled down to a total volume of about 40 ml.

The following table lists the buffering agents utilized, if any, temperatures utilized, pressures utilized, and yields of meso-2,3-dimethyl - 1,4 - bis(3,4-dimethoxyphenyl)-butane obtained in the above reaction:

TABLE

| Buffer | Temp., °C. | $H_2$-press., p.s.i.g. | Relative yield (percent) |
|---|---|---|---|
| None | 75 | 1,500 | 78 |
| 0.400 g. NaOAc | 75 | 1,500 | 82 |
| 0.420 g. NaOAc | 75 | 1,500 | 82 |
| 0.440 g. NaOAc | 75 | 1,500 | 85 |
| 0.460 g. NaOAc | 75 | 1,500 | 74 |
| 0.500 g. NaOAc | 75 | 1,500 | 81 |
| 0.600 g. NaOAc | 75 | 1,500 | 80 |
| 0.800 g. NaOAc | 75 | 1,500 | 79 |
| 0.440 g. NaOAc | 75 | 300 | 80 |
| 0.440 g. NaOAc | 75 | 150 | 79 |
| 0.460 g. NaOAc | 75 | 50 | 79 |
| 0.440 g. NaHCO$_3$ | 75 | 1,500 | 80 |

EXAMPLE 8

Meso 4,4'-(2,3-dimethyltetramethylene)-dipyrocatechol

Concentrated hydrobromic acid (860 g.) was added under nitrogen to meso 2,3-dimethyl-1,4-bis(3,4-dimethoxyphenyl)-butane (71.56 g., 0.201 mole) and the mixture was stirred and refluxed for 9 hours and allowed to cool to room temperature overnight with continued stirring. The dark colored solid product, collected by filtration, washed with water and dried afforded the crude product, meso 4,4'-(2,3-dimethyltetramethylene)-dipyrocatechol (59.27 g., 97.5 percent yield). Recrystallization from about 1600 ml. of 20 percent aqueous acetic acid with charcoal treatment gave a much lighter colored, but still gray-brown, crystalline product, (45.74 g., 77 percent recovery, 75 percent yield). A second recrystallization with charcoal gave light tan crystals, (91 percent recovery). After a third recrystallization the cream-colored crystals (95 percent recovery) had M.P. 184.5 to 186°, identical in all respects with purified natural meso-nordihydroguaiaretic acid, mixed M.P. 184–186°.

EXAMPLE 9

Racemic mixture of 1R,2(S),3(S)- and 1(S),2(R),3(R)-1,4-bis-(3,4-dimethoxyphenyl)-2,3-dimethyl-1-butanol Sodium (4.37 g., 0.19 mole) was added to anhydrous liquid ammonia (1.1 l.) and stirred under reflux under a nitrogen atmosphere. After one hour, a solution of all cis-3,4-dimethyl-2,5-bis(3,4 - dimethoxyphenyl)-tetrahydrofuran (18.6 g., 50 mmoles) in tetrahydrofuran (500 ml.) was added. After 2.5 hours of stirring under reflux, the ammonia was removed by warming the reaction mixture to room temperature. Addition of methanol (10 ml.) and then water (400 ml.), followed by extraction with chloroform, washing with water, drying over sodium sulfate, and removal of solvents gave the crude product (22.0 g.) which was crystallized from ethanol to afford white crystals of the racemic mixture of 1(R),2(S),3(S)- and 1(S),2(R),3(R)-1,4-bis(3,4-dimethoxyphenyl)-2,3-dimethyl-1-butanol (17.96 g., 48.0 mmoles, 96.0 percent yield).

EXAMPLE 10

Racemic mixture of 1(R),2(S),3(S)- and 1(S),2(R),3(R)-1,4-bis-(3,4-dimethoxyphenyl) - 2,3-dimethyl-1-acetoxy butane To an ice cold mixture of acetic anhydride (10 g.) and pyridine (10 g.), was added the racemic mixture of 1(R),2(S),3(S)- and 1(S),2(R),3(R)-1,4-bis(3,4-dimethoxyphenyl) - 2,3 - dimethyl-1-butanol (3.74 g., 10 mmoles) and stirred for 5 minutes before allowing the mixture to warm to room temperature. After 2 hours, the mixture was poured into water (200 ml.), extracted with chloroform, washed with water, dried, and freed of solvent. The crude product (4.59 g.) was crystallized to give 671 mg. of starting material and 2.75 g. of the racemic mixture of 1(R),2(S),3(S)- and 1(S),2(R), 3(R)-1,4 - bis(3,4 - dimethoxyphenyl - 2,3-dimethyl-1- acetoxy butane, (6.62 mmoles, 80.6 percent corrected yield).

EXAMPLE 11

Hydrogenolysis of the racemic mixture of 1(R),2(S),3(S)- and 1(S),2(R),3(R)-1,4-bis(3,4-dimethoxyphenyl)-2,3-dimethyl-1-acetoxy butane A mixture of the racemic mixture of 1(R),2(S),3(S)- and 1(S),2(R),3(R)-1,4-bis(3,4 - dimethoxyphenyl)-2,3-dimethyl-1-acetoxy butane (1.045 g., 2.5 mmoles), ethyl acetate (50 ml.), and powdered palladium oxide (100 mg.) was hydrogenated at room temperature and 1 atm. for 22 hours. Filtration and removal of solvent gave 1.015 g. of oil which was crystallized from hexane to give 0.703 g. of meso 2,3-dimethyl-1,4-bis(3,4-dimethoxyphenyl)-butane (1.96 mmoles, 79 percent) as a white solid.

I claim:

1. A process of preparing a diketone selected from the the group consisting of compounds of the formula:

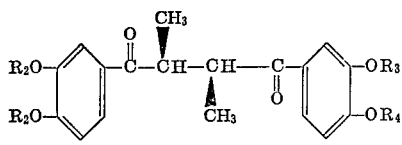

wherein $R_1$ and $R_2$ are lower alkyl, aralkyl, and taken together form a lower alkylene radical, and $R_3$ and $R_4$ are lower alkyl, aralkyl, and taken together form a lower alkylene radical, its antipode and racemic mixtures thereof which comprises reacting a compound of the formula:

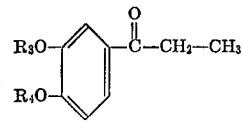

wherein $R_3$ and $R_4$ are as above;

with an alkali metal hydride or amide base of the formula:

MNHR wherein M is an alkali metal and R is hydrogen or lower alkyl;

in the presence of an inert solvent to form a salt and thereafter reacting said salt with a compound of the formula:

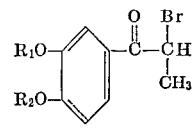

wherein $R_1$ and $R_2$ are as above;

to form said diketone.

2. The process of claim 1 wherein said solvent is liquid ammonia.

3. The process of claim 1 wherein said base is sodamide and said solvent is liquid ammonia.

References Cited

Atkinson et al.: Chem. Abstracts (1939), col. 578, vol. 33.

Baker et al.: J. Am. Chem. Soc. (1948), vol. 70, pp. 60-3.

Traverso, Chemical Abstracts (1959), vol. 55, col. 4468.

ALEX MAZEL, Primary Examiner

B. DENTZ, Assistant Examiner

U.S. Cl. X.R.

260—613, 347.8, 484